US010239577B2

(12) United States Patent
Johannessen (10) Patent No.: US 10,239,577 B2
(45) Date of Patent: Mar. 26, 2019

(54) TRANSMISSION FOR A HUMAN POWERED VEHICLE (HPV) AND SUCH VEHICLE

(71) Applicant: J.M.J. HOLDING APS, Køge (DK)

(72) Inventor: Jørgen Mosbaek Johannessen, Køge (DK)

(73) Assignee: J.M.J. Holdings APS, Koge (DK)

( * ) Notice: Subject to any disclaimer, the term of this patent is extended or adjusted under 35 U.S.C. 154(b) by 303 days.

(21) Appl. No.: 15/105,857

(22) PCT Filed: Dec. 19, 2013

(86) PCT No.: PCT/DK2013/050452
§ 371 (c)(1),
(2) Date: Jun. 17, 2016

(87) PCT Pub. No.: WO2015/090319
PCT Pub. Date: Jun. 25, 2015

(65) Prior Publication Data
US 2016/0318576 A1 Nov. 3, 2016

(51) Int. Cl.
*B62M 1/26* (2013.01)
*B62M 1/28* (2013.01)
(Continued)

(52) U.S. Cl.
CPC .............. *B62M 1/26* (2013.01); *B62M 1/28* (2013.01); *B62M 9/10* (2013.01); *B62M 11/04* (2013.01);
(Continued)

(58) Field of Classification Search
CPC . B62M 1/24; B62M 1/26; B62M 1/28; B62M 9/10; B62M 11/04; F16H 37/124; B62K 3/005
(Continued)

(56) References Cited

U.S. PATENT DOCUMENTS 258,559 A * 5/1882 Crane ...................... B62M 1/28
280/236
588,698 A * 8/1897 Eickershoff .......... F16H 31/001
74/136
(Continued)

FOREIGN PATENT DOCUMENTS

CH   100842    9/1923
DE   426146    3/1926
(Continued)

OTHER PUBLICATIONS

International Search Report regarding Application No. PCT/DK2013/050452, dated Jun. 30, 2014.

*Primary Examiner* — Joseph M Rocca
*Assistant Examiner* — Maurice L Williams
(74) *Attorney, Agent, or Firm* — Harness, Dickey & Pierce, P.L.C.

(57) ABSTRACT

The transmission is for transmitting a reciprocating pedal movement into a rotational movement and comprises a pair of pedals suspended for reciprocating movement, two rotating cam members (29) rotating around respective cam axes (33), each rotating cam member (29) having a peripheral cam surface (31), the rotating cam members (29) being coupled to a rotating member (35) through a respective one-way clutch. Flexible tension members (63) are connecting either pedal to a respective one of the rotating cam members (29), which are eccentric to provide for a gearing ratio between angular movement of the rotating cam member (29) and translational movement of the respective pedal to vary, such that the gearing ratio has a minimum value when the pedal is in an intermediate position between its extended position and its retracted position, and major values when the pedal is in its retracted or extended position.

20 Claims, 7 Drawing Sheets

(51) Int. Cl.
*B62M 9/10* (2006.01)
*B62M 11/04* (2006.01)
*F16H 37/12* (2006.01)
*B62M 3/04* (2006.01)
*B62K 3/00* (2006.01)
*B62K 5/02* (2013.01)
*B62M 11/02* (2006.01)

(52) U.S. Cl.
CPC ............ *F16H 37/124* (2013.01); *B62K 3/005* (2013.01); *B62K 5/02* (2013.01); *B62M 3/04* (2013.01); *B62M 11/02* (2013.01)

(58) Field of Classification Search
USPC .......................................... 280/252, 253–258
See application file for complete search history.

(56) References Cited

U.S. PATENT DOCUMENTS

| | | | | |
|---|---|---|---|---|
| 624,052 A * | 5/1899 | Konar | ..................... | B62M 1/28 74/137 |
| 1,014,181 A * | 1/1912 | Sachs | ..................... | B62L 5/04 188/218 R |
| 1,653,889 A * | 12/1927 | Clark | ..................... | B62M 1/28 280/221 |
| 2,584,447 A * | 2/1952 | Hayot | ..................... | B62M 9/08 474/50 |
| 2,630,333 A * | 3/1953 | Petersen | ................. | B62M 1/28 280/255 |
| 3,039,790 A * | 6/1962 | Trott | ..................... | B62M 1/28 280/251 |
| 3,759,543 A * | 9/1973 | Clark | ..................... | B62M 1/28 280/236 |
| 3,889,974 A * | 6/1975 | Kallander | ............... | B62M 1/28 280/251 |
| 3,998,469 A * | 12/1976 | Ruys | ..................... | B62M 1/32 280/254 |
| 4,026,571 A * | 5/1977 | Vereyken | ................ | B62M 1/28 280/251 |
| 4,226,435 A * | 10/1980 | Efros | ..................... | B62K 19/36 280/201 |
| 4,379,566 A * | 4/1983 | Titcomb | ................. | B62K 21/18 280/251 |
| 5,121,654 A * | 6/1992 | Fasce | ..................... | B62M 1/105 280/234 |
| 5,496,051 A * | 3/1996 | Farmos | ..................... | B62M 1/24 280/251 |
| 5,688,199 A * | 11/1997 | Spirig | ..................... | B62M 9/08 474/49 |
| 5,785,337 A * | 7/1998 | Ming | ..................... | B62M 1/32 280/251 |
| 6,209,900 B1 * | 4/2001 | Yoshizawa | ............... | B62M 1/26 280/252 |
| 9,234,573 B2 * | 1/2016 | Saccucci | ................. | B62M 9/10 |
| 2008/0146390 A1 * | 6/2008 | Lacreu | ................... | B62K 3/005 474/68 |
| 2009/0134597 A1 * | 5/2009 | Buchberger | ........... | B62K 3/002 280/251 |
| 2010/0320718 A1 * | 12/2010 | Buchberger | ............. | B62M 1/28 280/221 |
| 2011/0068554 A1 * | 3/2011 | Armand | ................. | B62K 3/002 280/253 |
| 2012/0085189 A1 * | 4/2012 | Coe | ......................... | F16H 3/426 74/415 |
| 2013/0168942 A1 * | 7/2013 | Musgrove | ................ | B62M 9/04 280/210 |
| 2013/0307245 A1 * | 11/2013 | Koscielecka | ............ | B62M 1/24 280/258 |
| 2014/0333043 A1 * | 11/2014 | Gendell | ................... | B62M 1/30 280/253 |
| 2015/0076787 A1 * | 3/2015 | Kipnis | ..................... | B62M 1/28 280/251 |

FOREIGN PATENT DOCUMENTS

| | | | | |
|---|---|---|---|---|
| DE | 947858 C | 8/1956 | | |
| DE | 4319104 A1 | 12/1994 | | |
| EP | 0943536 A2 | 9/1999 | | |
| FR | 1498970 | 11/1968 | | |
| FR | 2914723 A1 * | 10/2008 | ............. | B62M 1/24 |
| GB | 6225 | 9/1911 | | |
| GB | 2379426 A | 3/2003 | | |
| GB | 2462315 A | 2/2010 | | |
| GB | 2474215 B | 8/2012 | | |
| WO | WO-02098723 A1 * | 12/2002 | ............. | B62M 1/36 |
| WO | WO-2007133681 A2 * | 11/2007 | ............... | B62J 1/28 |
| WO | WO-2008012521 A1 | 1/2008 | | |
| WO | WO-2010015802 A1 | 2/2010 | | |
| WO | WO-2010143987 A1 | 12/2010 | | |

* cited by examiner

TRANSMISSION FOR A HUMAN POWERED VEHICLE (HPV) AND SUCH VEHICLE

CROSS REFERENCE TO RELATED APPLICATION

This application is a U.S. National Phase under 35 U.S.C. 371 of International Application No. PCT/DK2013/050452, filed Dec. 19, 2013, and published in English as WO 2015/090319 A1 on Jun. 25, 2015. The entire disclosure of the above application is incorporated herein by reference.

The present invention relates to a transmission for a human powered vehicle (HPV), for transmitting a reciprocating pedal movement into a rotational movement, comprising a pair of pedals suspended for reciprocating movement between respective retracted and extended positions, a rotating element mounted for rotation around an axis of rotation, two rotating cam members rotating around respective cam axes, each rotating cam member having a peripheral cam surface, the rotating cam members being coupled to the rotating member through a respective one-way clutch for the cam members to drive the rotating element in a single rotational direction, flexible tension members connecting either pedal to a respective one of the rotating cam members, each flexible tension member being fastened relative to the respective rotating cam member and being wound onto the peripheral cam surface of the respective rotating cam member, an unwound part of the flexible tension member extending towards the respective pedal to be connected thereto to be pulled thereby, whereby the unwound part disengages the peripheral cam surface at a point of tangency having a radial distance from the respective cam axis, thereby providing a gearing ratio between angular movement of the rotating cam member and translational movement of the respective pedal.

The invention further relates to a human powered vehicle comprising such transmission.

Transmissions and human powered vehicles, especially bicycles, of the above mentioned art has been known for many years and have been presented in many embodiments. According to prior art as well to the invention the pedals may be suspended for linear, especially rectilinear, reciprocating movement or for pendulous reciprocating movement, whereby pedals are attached to an end of an arm that is hinged at its other end for oscillatory rotational movement, the flexible tension member usually extending substantially at right angles to the arm, at least when the latter is in an intermediate position between a retracted position and an extended position, whereby a ratio between a force transmitting movement of the flexible tension member and a movement of the pedal is substantially constant or varies insignificantly.

Since the movements of the pedals in transmissions of the art referred to herein and according to the invention are reciprocating these movements are herein referred to as translational though not necessarily rectilinear.

Thus GB-A-6225 discloses a bicycle with a transmission of the above art in which the rotating cam members are provided as scrolls or fusees whereby the gearing ratio between the angular movement of the rotating cam member and the translational movement of the respective pedal has a minimum at the initiation of a pedal movement from the retracted position towards the extended position and a maximum at the end of said movement at the extended position. Speed gears, not shown, may be interposed between the scrolls and the driven wheel of the bicycle.

WO-A-2010/015802 discloses another bicycle with a transmission of the above art wherein the rotating cam members are provided by scrolls as according to the above mentioned GB-A-6225. According to WO-A-2010/015802 the scrolls are mutually connected for opposite movement through a differential gear mechanism, thereby providing for the rotation of one scroll in a rotational forward direction, when the corresponding pedal is moved towards its extended position and the flexible tension member is unwound from the scroll, to provide for opposite rotation in a rearwards direction of the second scroll thereby rewinding the flexible tension member attached thereto and moving the second pedal towards its retracted position.

DE-A-947 858 discloses a bicycle with a transmission of the above art with pendulous suspended pedals and rotating cam members provided as scrolls. The angle between the pendulous arm and thus the direction of movement of the pedal and the flexible tension member varies greatly from nearly zero to more than 90° during the movement of the pedal from its retracted position to its extended position and correspondingly the ratio between the force transmitting movement of the flexible tension member and the movement of the pedal varies greatly. To compensate for this variation the scrolls are formed to provide a small radial distance of the point of tangency from the axis of rotation when the pedal is in its retracted position and a large radial distance of the point of tangency from the axis of rotation when the pedal is in its extended position in order to obtain a constant rotational moment throughout the stroke of the pedal.

The present inventor has envisaged that since the pedals and accordingly the feet of the user of a human powered vehicle during ride at constant speed, which is the case most of the time, performs a reciprocating movement whereby the speed of the respective pedal and foot starts at zero from the retracted position and ends at zero at when reaching the extended position. The known transmissions seem to completely ignore this fact. The result is that when starting a stroke of a pedal, i.e. when starting from the retracted position the user will not transmit power to the rotating element because the speed of the pedal and foot is too small. When the user has accelerated the foot and pedal to catch up with the speed of the rotating element or the speed of an element to which the power might be further transferred from the rotating element, the user may sense through the pedal an uncomfortable impact.

The object of the present invention is to avoid or minimize these drawbacks of the prior art.

This is fulfilled accordance to the invention in that said radial distance varies in accordance with the position of the respective pedal between its extended position and its retracted position, whereby said gearing ratio has a minimum value when the respective pedal is in an intermediate position between its extended position and its retracted position, a first major value when the respective pedal is in its retracted position, and a second major value, when the respective pedal is in its extended position, whereby the minimum value is smaller than either of the first and the second major value. In an embodiment the minimum value is smaller than 90% of either of the first and the second major value. Hereby is obtained that at the initiation of a tread or stroke of a foot, while a vehicle equipped with a transmission according to the invention is at speed, the user need to apply only little speed to the foot to catch up through the transmission with the speed of the vehicle which thus may be done in a controlled and comfortable manner. Having caught up with the speed of the vehicle the user will apply force to the pedal and the speed of the foot will due to the variation (decrease) of the gearing ratio increase and the force moment applied to the rotating cam member and further to the rotating member will likewise increase relative to the force applied to the pedal thereby accelerating the vehicle to compensate for any loss of speed while reversing the movement of the feet. When the pedal and the foot of the user is approaching the extended position the speed of the pedal will slow down due to increase of the gear ratio given that the speed of the vehicle is constant thereby providing a natural transition to the following return stroke of the foot.

In an embodiment said radial distance varies in accordance with the position of the respective pedal between its extended position and its retracted position, whereby said radial distance has a maximum value when the respective pedal is in an intermediate position between its extended position and its retracted position, a first minor value when the respective pedal is in its retracted position, and a second minor value, when the respective pedal is in its extended position. This embodiment is most usable when the transmission provides for the ratio between a force transmitting movement of the flexible tension member and a movement of the pedal to be substantially constant or vary only insignificantly.

In an embodiment each rotating cam member is a cam wheel its cam axis being eccentric. Hereby the cam wheel may be circular, elliptic or another shape that will provide a suitable variation of the gearing ratio between the angular movement of the rotating cam member and the translational movement of the respective pedal.

In an embodiment the two rotating cam members are mutually connected for mutual opposite rotation. Hereby a spring or other member that needs to be tensioned by force of the user for return of the rotating cam member, the flexible tension member and the pedal after a pedal stroke is avoided thus minimizing the loss of power inherent to the transmission.

In an embodiment the transmission comprises a driven wheel, a drive train connecting the two rotating cam members and the driven wheel, said drive train comprising said rotating member and a free wheel mechanism allowing reverse rotation of the driven wheel. Hereby is obtained that when the transmission is applied to a road vehicle such vehicle may be reversed, though not by means of the transmission, but the transmission will not block reversing. In a further embodiment the drive train comprises a gear shift mechanism such as a gear change mechanism well known from the art of bicycles. Thus in an embodiment the driven wheel comprises a bicycle rear wheel hub, e.g. an internal gear hub. In a further embodiment the rotating member comprises a sprocket wheel and the drive train comprises a sprocket chain. With this embodiment a gear change mechanism may comprise derailleur gears.

In an embodiment an elastic stop is provided for the pedals' movement at the extended positions. This will facilitate the reversing of the movement of the pedals since part of the kinetic energy of the moving parts including the pedals, etc. will be absorbed by the elastic stop to be returned to said moving parts in reversal of their movement. In an embodiment the elastic stop is attached to the rotating cam members limiting their rotational movement.

In an embodiment the pedals are mutually connected for mutual opposite movement. This provided for use of shoes fastened to the pedals as it is generally known from racer bikes whereby the user may apply additional propulsion force while one pedal is being pushed from the retracted position towards the extended position by also pulling the other pedal.

A human powered vehicle comprising according to the invention a transmission as described above may e.g. be land vehicle such as a bicycle or a tricycle, which may be of the recumbent kind possibly with a fairing, etc. or it may e.g. be a boat. Further the invention may be applied to a human powered vehicle with an assisting motor, especially an assisting electric motor, such as a bicycle or tricycle with an electric hub motor, which per se is well known in the art.

In the following the invention will be explained in further detail by way of example having reference to the accompanying schematic drawings, in which.

Figure 1:
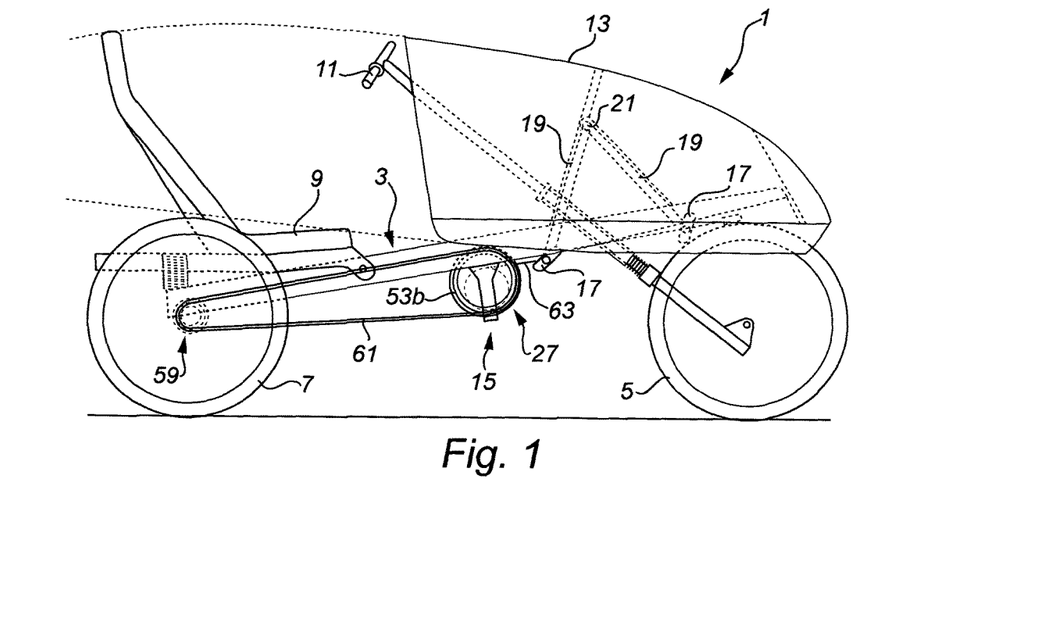
FIG. 1 is a side view from the right side of a recumbent tricycle according to the invention.
Figure 2:
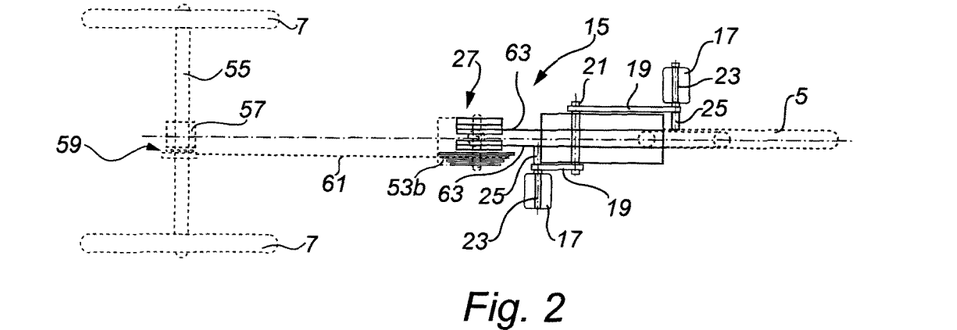
FIG. 2 is a top view of the tricycle of FIG. 1 with parts omitted for sake of clarity.

FIGS. 1 and 2 show a recumbent tricycle 1 comprising a main frame 3, a front wheel 5, two rear wheels 7, a seat 9, a handle bar 11 for steering by turning the front wheel 5, a fairing 13, and a transmission 15 for transmitting driving power from a user of the tricycle, i.e. a cyclist, to the rear wheels 7, which thus are driven wheels of the tricycle 1.

The transmission 15 comprises two pedals 17 each suspended in an arm 19 which per se is rotatably suspended for reciprocating rotation around a first axis 21. The pedals 17 are each rotatable on pedal shafts 23 each having an extension 25 extending approximately to a vertical centre plane of the tricycle 1.

Figure 3:
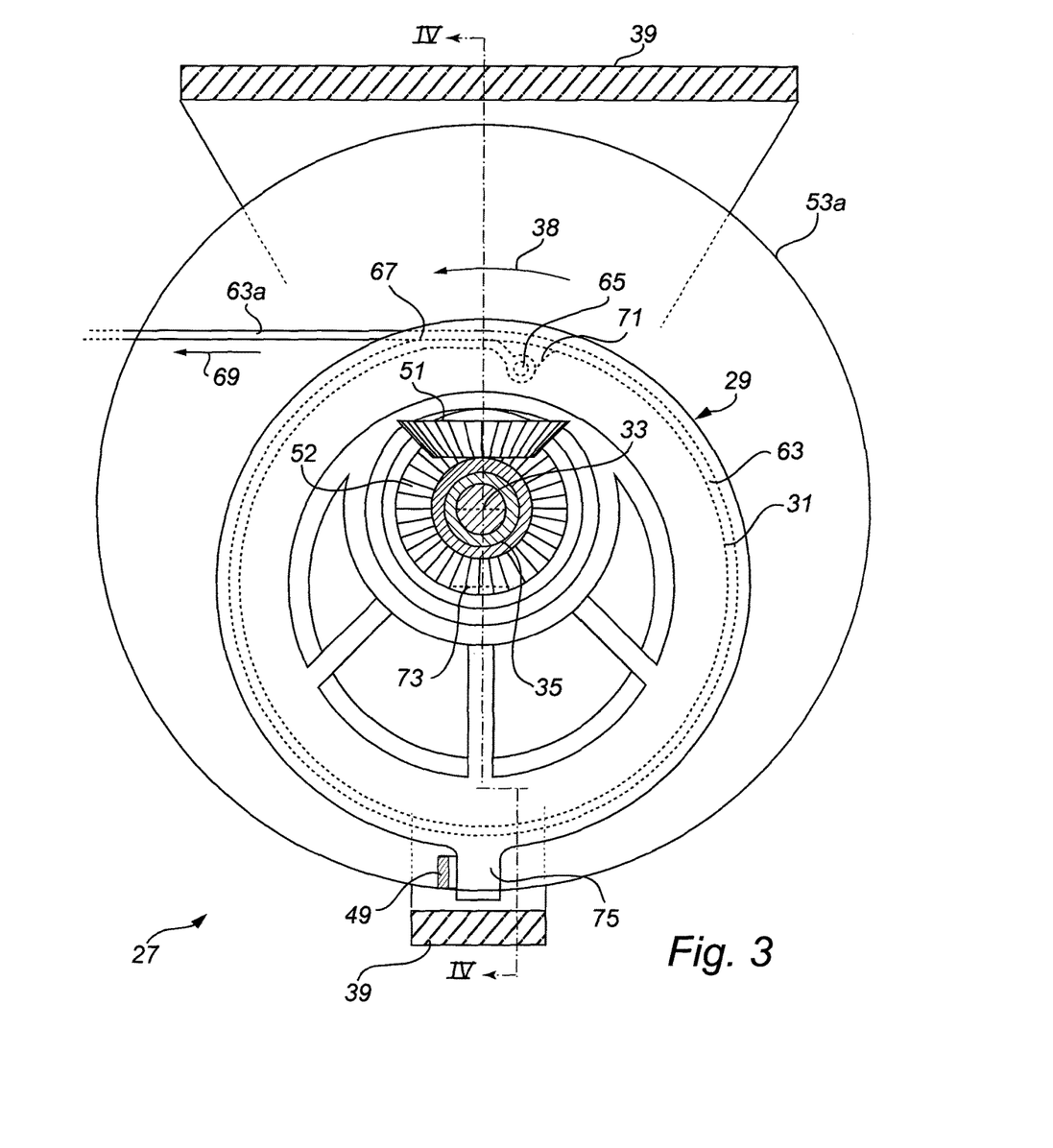
FIG. 3 is a side view of a central part of a transmission of the tricycle of FIG. 1 sectioned along line III-III in FIG. 4.
Figure 4:
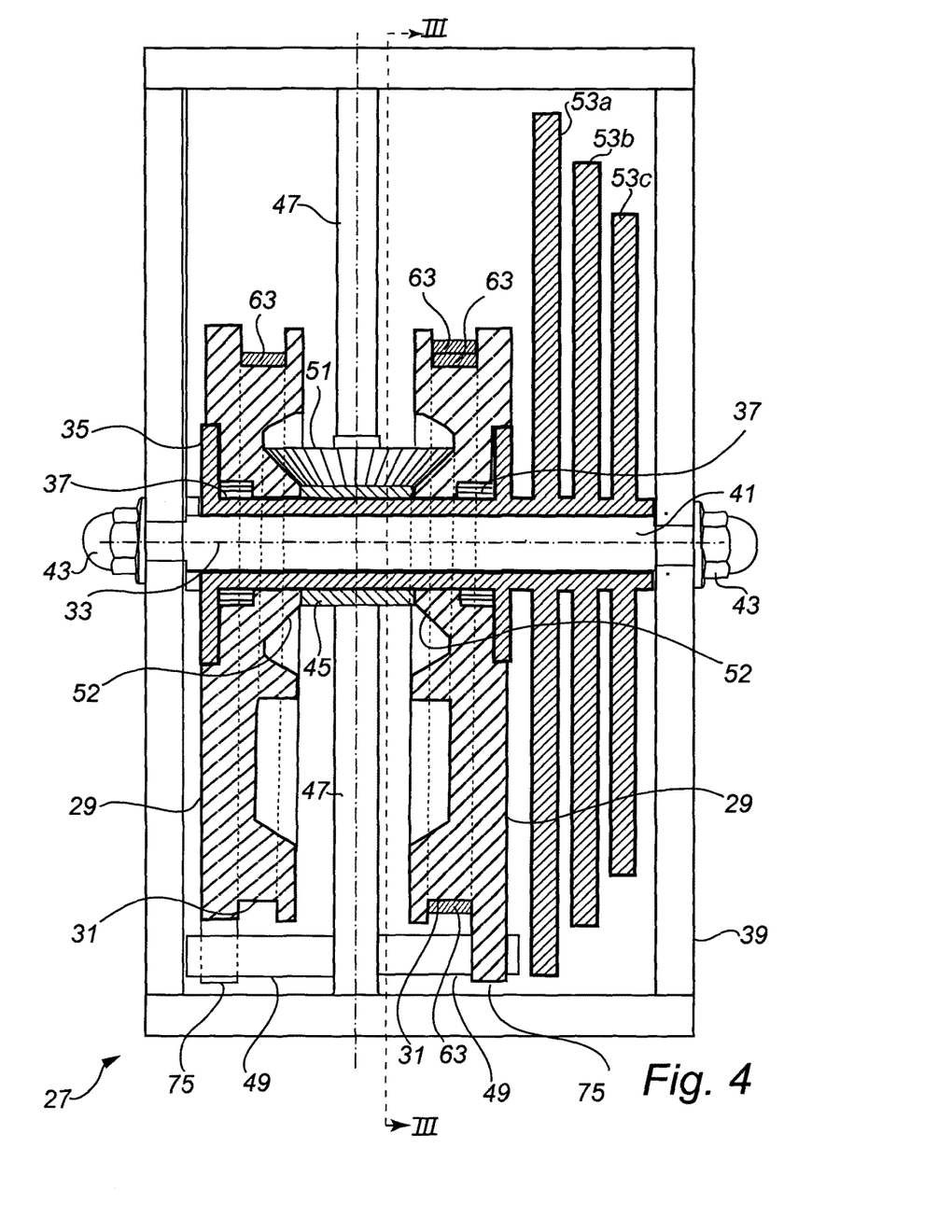
FIG. 4 shows a section along line IV-IV in FIG. 3.

The transmission 15 further comprises a belt and cam drive mechanism 27 which is more clearly seen in FIGS. 3 and 4. The belt and cam drive mechanism 27 comprises two rotating cam members 29 each having a peripheral cam surface 31. The rotating cam members 29 are rotatable around cam axes 33, which in the present embodiment are coinciding. The rotating cam members 29 are thus rotatably mounted on a rotating element 35, which is rotatable on an axis that is coinciding with the cam axes 33. The rotating cam members 29 are each coupled to the rotating element 35 through a respective one-way clutch 37 allowing the rotating cam members 29 to individually drive the rotating element 35 in a single rotational direction 38 but not in the opposite rotational direction.

The belt and cam drive mechanism 27 comprises a drive frame 39 which is fixedly mounted on the main frame 3. The drive frame 39 carries a horizontal shaft 41 mounted by means of nuts 43. The horizontal shaft 41 carries rotatably the rotating element 35 and is coaxial with the cam axes 33. The rotating element 35 carries a bushing 45 that per se is fastened to an upper and a lower part of a vertical shaft 47, which is fixed relative to the drive frame 39.

In the present embodiment the vertical shaft 47 carries two cantilever springs 49 the function of which will be explained below, and further the vertical shaft 47 carries rotatably a pinion 51 that engages with pinion shaped cogged parts 52 of the rotating cam members 29 the function of which will likewise be explained below.

The rotating element 35 is carrying a number of front sprocket wheels 53a, 53b, 53c, which number in the present embodiment is three, the front sprocket wheels 53a, 53b, 53c being attached to the rotating element 35 to be rotated thereby at least in the rotational direction 38.

The rear wheels 7 are fixedly mounted on either part of a rear wheel drive shaft 55 said two parts being connected through a differential gear 57 to allow the two parts to rotate relative to each other. One of the parts of the rear wheel drive shaft 55 carries a number of rear sprocket wheels 59 provided to drive the rear wheel drive shaft 55 in the rotational direction 38. One of the front sprocket wheels 53b and one of the rear sprocket wheels 59 are connected by a sprocket chain 61 for the respective front sprocket wheel 53b to transmit driving force to the respective rear sprocket wheel 59 as it is indeed very well known especially from the art of bicycling.

Either pedal 17 is connected to a respective one of the rotating cam members 29 as it will be explained in the following having reference to a single one of the two pairs of a pedal and a rotating cam member, more specifically the right pair. Thus a flexible tension member 63 is connected at one end thereof to the extension 25 of the pedal shaft 23 of the pedal 17. The flexible tension member 63, which in the present embodiment is an inextensible belt or band, extends to the rotating cam member 29 and is fastened thereto by means of a cross pin 65. Since the pedal 17, i.e. the right one, in FIGS. 1 and 2 is in a retracted position the flexible tension member 63 extends from the cross pin 65 around the rotating cam member 29 engaging the peripheral cam surface 31 thereof before the flexible tension member 63 is separated or disengaged from the peripheral cam surface 31 at a point of tangency 67 for an unwound part 63a of the flexible tension member 63 to extend towards the pedal 17 as indicated by an arrow 69 as seen in FIG. 3.

In the present embodiment the peripheral cam surface 31 is circular, apart from a recess 71 provided to receive the end of the flexible tension member 63 fastened to the cross pin 65. The circular shape of the peripheral cam surface 31 has a centre 73 which is offset from the cam axes 33. At a position approximately opposite the recess 71 the rotating cam member 29 is provided with a protrusion 75 which in the position of the rotating cam member 29 shown in FIGS. 3 and 4 abuts on the respective cantilever spring 49, which in the situation shown in FIG. 3 is slightly deflected.

It should be noted that the two rotating cam members 29 are similar but mutually mirror inverted.

Figure 4A:
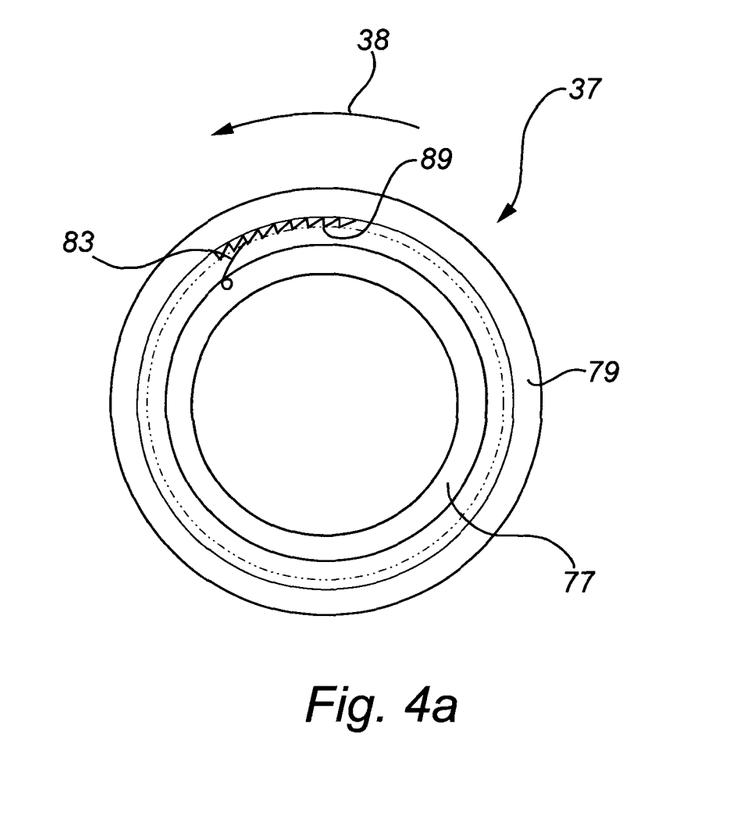
FIG. 4a illustrates a one-way clutch.

The one-way clutch 37 may be embodied in numerous different ways, but as an example FIG. 4a show a ratchet gear mechanism comprising an inner ring 77 to be fastened to the rotating element 35 and an outer ring 79 to be fastened to the respective rotating cam member 29. The outer ring 79 comprises an inner ratchet gear 81 (only a sector of which is shown) and the inner ring 77 comprises at least one (as shown) biased or spring-loaded pawl member 83 that will engage with the inner ratchet gear 81 when the rotating cam member and therewith the outer ring 79 is rotated in the rotational direction 38 for the inner ring 77 to be rotationally driven by the outer ring 79, and that will ride over the inner ratchet gear 81 the when the rotating cam member and therewith the outer ring 79 is rotated in the direction opposite to the rotational direction 38 relative to inner ring 77.

Alternatively the one-way clutch may be embodied as disclosed in U.S. Pat. No. 1,014,181, especially FIG. 1, which discloses a one-way clutch for a bicycle rear wheel that engages when a sprocket wheel is turned in a driving direction and disengage when the sprocket wheel is at rest, and that will keep disengaged on wheeling the bicycle backward. Applying such one-way clutch instead of the one-way clutch 37 would allow the rotating element 35 to be rotated in the direction opposite the rotational directing 38 without the rotating cam members 29 being rotated e.g. when wheeling the tricycle 1 backward.

The tricycle 1 and its transmission 15 work as follows:

When driving the tricycle 1 the cyclist will sit in the seat 9 and tread alternately the pedals 17 from the retracted position towards the extended position of the respective pedal 17 and allow the pedal 17 to move back towards the retracted position thus providing a reciprocating pedal movement.

When a pedal 17, such as e.g. the right pedal, is trodden towards its extended position the flexible tension member 63 will be pulled and rotate in the rotational direction 38 the respective rotating cam member 29 which will in turn, through the one-way clutch 37, rotate the rotating element 35 that rotates the front sprocket wheels 53a, 53b, 53c rotating through the sprocket chain 61 the rear sprocket wheels 59 and accordingly the rear wheels 7 to drive forward the tricycle 1.

Since the two rotating cam members 29 are in the embodiment shown mutually drivingly connected through their respective pinion shaped cogged parts 52 and the pinion 51 the left rotating cam member will be rotated in the direction opposite the rotational direction 38 thereby winding up its respective flexible tension member 63 retracting the left pedal 17. Accordingly the two pedals 17 will perform opposite reciprocating movements or, in other words, perform reciprocating movements that are generally phase shifted by 180°.

When during driving the cyclist reverses the movement of his or her feet and thereby of the pedals to start a tread movement i.e. an active and propulsion-providing movement of one of the pedals 17 the respective foot and pedal will start at zero speed. The foot and pedal need to be accelerated before reaching a speed corresponding to the actual speed of the tricycle at the given point of time. Due to the offset of the centres 73 of the respective rotating cam members 29 from the cam axes 33 a relatively small radial distance between the cam axis 33 and the point of tangency 67 is present when the respective pedal 17 is in its retracted position and accordingly when a tread movement begins. The small radial distance entails a relatively large i.e. a major gear ratio between the translational movement of the respective pedal 17 and thus of the respective flexible tension member 63 and the angular movement of the rotating cam member 29 around the cam axis 33. The major gear ratio entails that a relative slow speed of the pedal 17 corresponds to the actual speed of the tricycle 1 and accordingly the speed of the pedal 17 corresponding to the actual speed of the tricycle 1 is easily reached at the beginning of the tread movement while the pedal is still close to its retracted position. On the other hand the major gear ratio also entails that a given force applied to the pedal 17 will be transmitted into a relatively small rotational moment acting on the rear wheels 7 giving only little propulsive force.

When the pedal 17 is trodden further said radial distance will be enlarged as the flexible tension member 63 is unwound from the rotating cam member 29 rotating the latter and accordingly the gearing ratio will decrease. The speed of the pedal 17 will increase even if the speed of the tricycle 1 is constant and the force applied to the pedal 17 will be transmitted as an increasing rotational moment to the rear wheels 7 providing an increasing propulsive force that will be able to accelerate the tricycle 1 or allow it to maintain a certain speed pursued by the cyclist.

At an intermediate position of the pedal 17 between the retracted position and the extended position shown for respectively the right and the left pedal 17 in FIGS. 1 and 2 the gearing ratio has a minimum value and when further extending or treading forward the pedal 17 the gearing ratio will increase. The cyclist may, at least initially when the gearing ratio increases, increase the force applied to the pedal in an attempt to maintain the speed of the foot and pedal 17. Subsequently the gearing ratio will increase further and the cyclist will be impelled to decrease the speed of the foot and pedal 17 which eventually has to stop when the extended position is reached.

When the pedal 17 has reached the extended position the gearing ratio again reaches the initial major value due to the embodiment of the rotational cam member 29 as an eccentric cam wheel.

In the embodiment shown the eccentricity, i.e. the distance between the cam axes 33 and the centre 73 of the rotating cam members 29, is ⅙ of the diameter of the peripheral cam surface 31 providing a minimum value of the gearing ratio of 50% of the major value of the gearing ratio.

Further when the pedal 17 has reached the extended position the protrusion 75 of the rotating cam member 29 will abut on the cantilever spring 49 on its opposite side compared to the situation shown in FIGS. 3 and 4. Simultaneously the protrusion of the other rotational cam member, that has performed a reverse rotational movement compared to the former rotational cam member, will abut on its respective cantilever spring 49 on the opposite side. Both cantilever springs 49 will be deflected to store energy that will be released to assist initiation of the next tread movement. Thus the cantilever springs 49 will provide an elastic stop for the pedals' 17 movement at the extended positions and will provide the effect of transmitting energy from one tread movement to the next when one tread movement is immediately succeeded by another. This effect of transmitting energy from one tread movement to the next is comparable to the well-known effect of a flywheel.

As an additional feature in the present embodiment the pedals 17 are mutually connected for mutual opposite movement in that an idler wheel 85 is provided in front of the pedals 17, as illustrated in FIGS. 1 and 2, and a further flexible tension member 87, such as an inextensible band, extends from one pedal 17 around the idler wheel 85 and to the other pedal to be fastened respectively relative to the pedals 17 e.g. to the extensions 25. By this arrangement together with the fact that the two rotating cam members are mutually connected for mutual opposite rotation it is possible to provide propulsive force to the rear wheels 7 by applying a retractive force to a pedal 17 i.e. by applying a force tending to move the pedal from the extended position towards the retracted position as it is known in the art of bicycle racing when the cyclist uses shoes that are releasably fixed to the pedals. As an alternative to the further flexible tension member 87 and the idler wheel 85 the arms 19 might be connected through a differential gear at the first axis 21.

Since the front sprocket wheels 53*a*, 53*b*, 53*c* and the rear sprocket wheels 59 are interconnected by a sprocket chain 61 derailleur mechanisms of kinds well-known in the art of bicycling may be provided to shift the sprocket chain 61 between the respective sprocket wheels in order to select different gearing ratios between the rotational speed of the front sprocket wheels and the rear sprocket wheels.

It is seen that the one-way clutches 37, the rotating element 35, the front sprocket wheels 53*a*, 53*b*, 53*c*, the sprocket chain 61, the rear sprocket wheels 59 and the rear wheel drive shaft constitute a drive train connecting the rotating cam members 29 and the rear wheels 7, which accordingly are driven wheels. When a one-way clutch as disclosed in U.S. Pat. No. 1,014,181, FIG. 1 is used, as mentioned above, the drive train will comprise a free wheel mechanism allowing reverse rotation of the driven wheels 7 when the tricycle 1 is wheeled backward. Such one-way clutch might be inserted in the drive train in another position than the one suggested herein.

Figure 5:
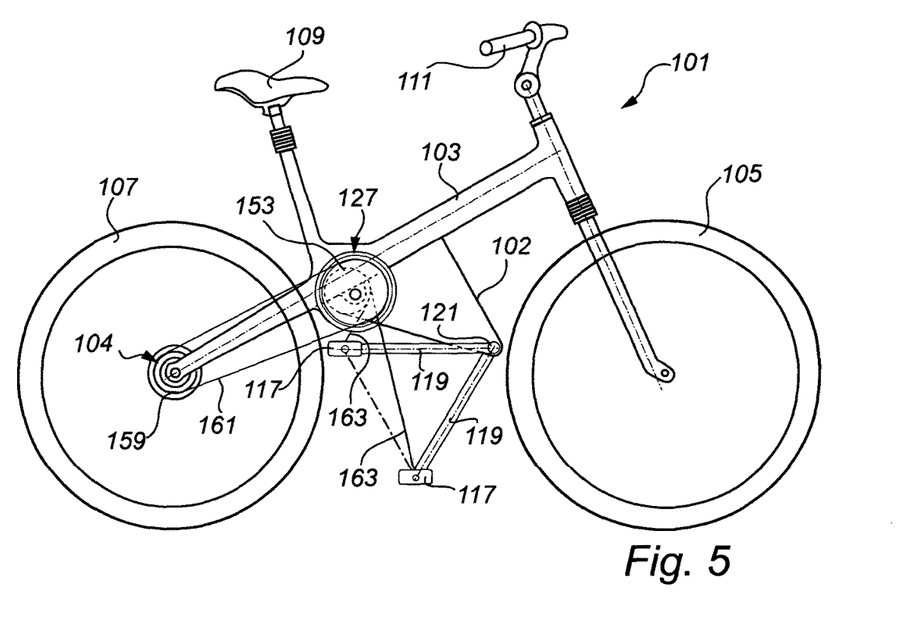
FIG. 5 is a side view of a bicycle according to the invention.
Figure 6:
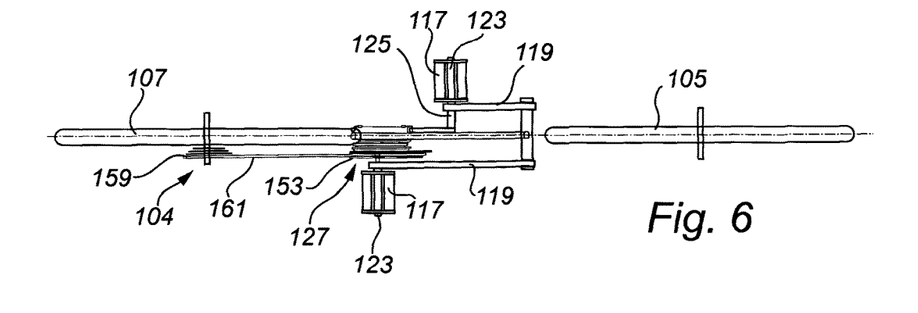
FIG. 6 is a top view of the bicycle of FIG. 5 with parts omitted for sake of clarity.

FIGS. 5 and 6 show a first bicycle comprising a transmission according to the present invention. Like elements are given the same reference numerals as in FIGS. 1 to 4 with the addition of 100. Thus FIGS. 5 and 6 show a bicycle 101 with a main frame 103, a front wheel 105, a driven rear wheel 107, a saddle 109 and a handle bar 111. Two arms 119 for suspending two pedals 117 are mounted on a bracket 102 for rotation around a first axis 121.

A belt and cam drive mechanism 127 similar to the belt and cam drive mechanism 27 described above is attached to the mainframe 103. The belt and cam drive mechanism 127 is connected by flexible tension members 163 to extensions 125 of pedal shafts 123, and a front sprocket wheel 153 of the belt and cam drive mechanism 127 is through a sprocket chain 161 connected with a hub 104 of the rear wheel 107. The hub 104 may be a known bicycle hub carrying a set of sprocket wheels 159 for the sprocket chain 161 to be shifted between different sprocket wheels by means of a known derailleur mechanism not shown or the hub may be an internal gear hub.

In this embodiment the first axis 121 is positioned in the vicinity of the front wheel 105 and the arms 119 extend rearwards there from. Accordingly when treading down a pedal 117 the cyclist will initially move the treading foot slightly backwards and subsequently slightly forwards following downwards the circular curve established by the arm 119.

Figure 7:
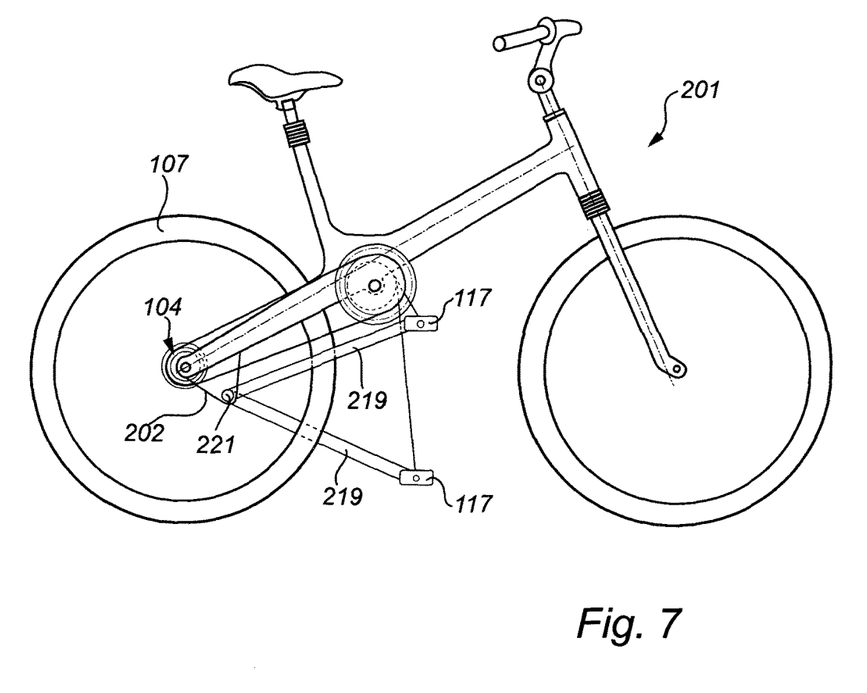
FIG. 7 is a side view of a second embodiment of a bicycle according to the invention.

FIG. 7 shows a second bicycle 201 comprising a transmission according to the present invention. The second bicycle 201 is to a certain degree similar to the first bicycle 101, and similar elements are given the same reference numerals. Thus the second bicycle 201 is similar to the first bicycle 101 apart from the fact that arms 219 for suspending pedals 117 are mounted on brackets 202 to be rotatable around a first axis 221 which thus is positioned in the vicinity of the hub 104 of the rear wheel 107. Accordingly the pattern of foot movement is a little different, as when treading down a pedal 117 the cyclist will initially move the treading foot slightly forwards and subsequently slightly backwards following downwards the circular curve established by the arm 219.

Figures 8, 9:
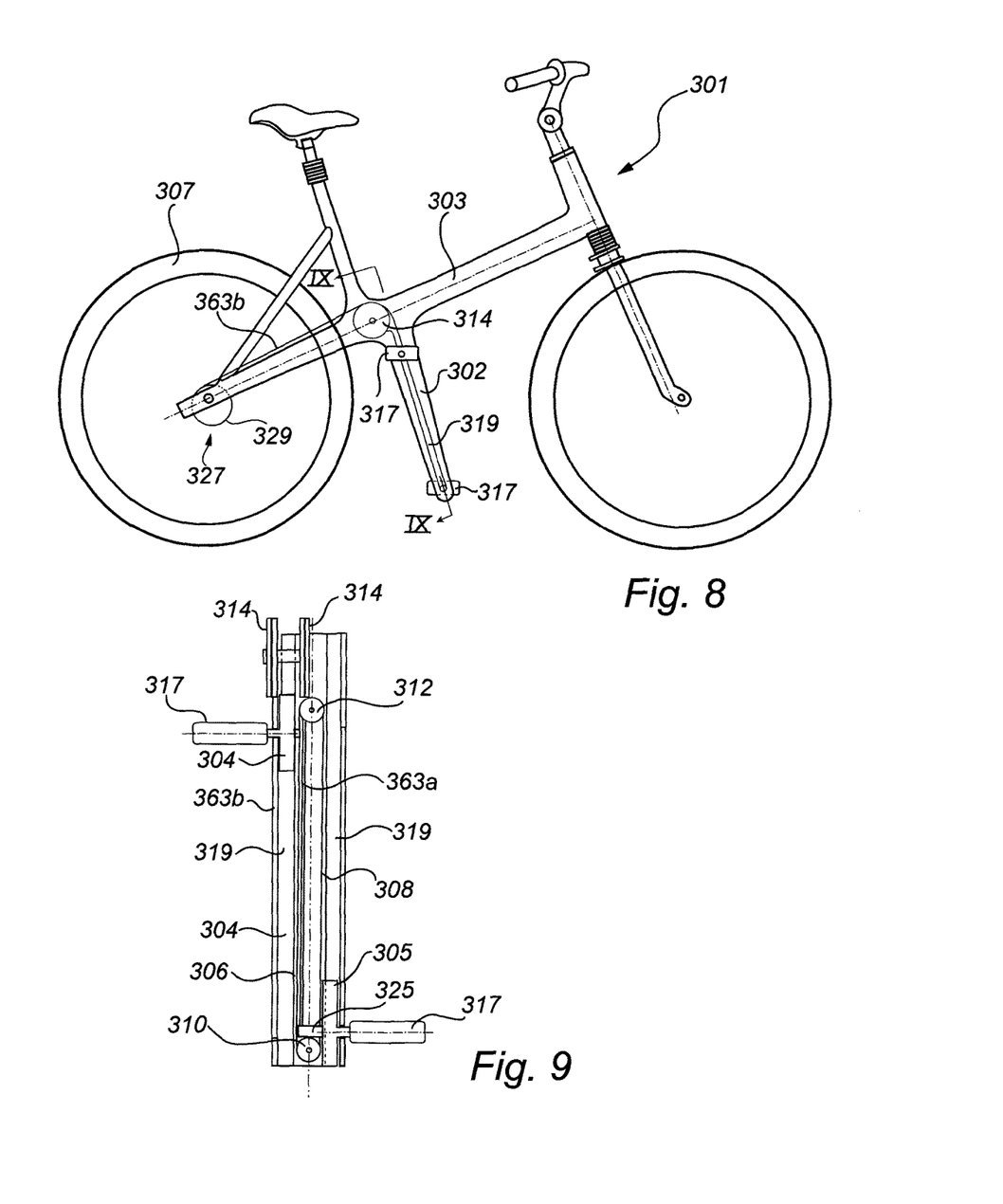
FIG. 8 is a side view of a third embodiment of a bicycle according to the invention.
FIG. 9 shows a section along line IX-IX in FIG. 8.

FIGS. 8 and 9 show a third bicycle 301 comprising a transmission according to the present invention. In this embodiment a belt and cam drive mechanism 327 comprising rotating cam members 329 is coupled directly to the hub of the rear wheel 307 and the rotating member of the belt and drive mechanism is a driving part of the hub e.g. corresponding to a part of an ordinary bicycle rear wheel hub that carries the rear sprocket wheel(s).

Instead of arms suspending the pedals the bicycle 301 comprises a pair of tracks 319 attached to a bracket 302 extending from the main frame 303 of the bicycle 301. The tracks 319 carry respectively a right slide 304 and a left slide 305 that in turn suspends pedals 317. The slides 304 and 305 are mutually connected through two belts or other flexible tension members 306 and 308, which are lead respectively around a pulley 310 and 312, whereby the slides 304 and 305 are bound to move mutually opposite in linear reciprocating movements.

The left slide 305 comprises an extension 325 to which a left flexible tension member 363a is attached. A right flexible tension member 363b is attached to the right slide 304. The left and right flexible tension members 363a and 363b are lead over second pulleys 314 to the belt and cam drive mechanism 327.

The function of the transmission of the third bicycle 301 is similar to the function of the transmission of the tricycle 1 from the pedals pulling the flexible tension members 363a and 363b, respectively 63 to the rotating element including the variations of the gearing ratio between the angular movement of rotating cam members and the translational movement of the pedals. Only do the pedals 317 of the third bicycle 301 perform rectilinear movements rather than circle sector curved movements as do the pedals 17 of the tricycle 1, whose movements are induced by the latter pedals 17 being suspended in the arms 19 rotating around the first axis 21.

It should be noted that though in the above examples the rotating cam members have been illustrated as eccentric, substantially circular cam wheels other shapes may be used to provide a suitable variation of the gearing ratio between the angular movement of a rotating cam member and translational movement of the respective pedal. Thus the rotating cam members in the shape of non-circular wheels e.g. elliptic wheels or wheels of other non-circular shapes might be used. Further the rotating cam members might not be wheels, i.e. elements having an endless peripheral cam surface, but the rotating cam members might have loop-shaped peripheral cam surfaces extending more that 360° around the cam axis or the peripheral cam surface might be an open-ended surface extending less than 360° around the cam axis, whereby in the latter two examples the major gearing ratio values occurring when a pedal is in its retracted and extended position, respectively, might be different.

The invention claimed is:

1. A transmission for a human powered vehicle (HPV), for transmitting a reciprocating pedal movement into a rotational movement, comprising:
    a pair of pedals suspended for reciprocating movement between respective retracted and extended positions;
    a rotating element mounted for rotation around an axis of rotation;
    two rotating cam members rotating around respective cam axes, each rotating cam member having a peripheral cam surface;
    the rotating cam members being coupled to the rotating member through a respective one-way clutch for the rotating cam members to drive the rotating element in a single rotational direction;
    flexible tension members connecting either pedal to a respective one of the rotating cam members, each flexible tension member being fastened relative to the respective rotating cam member and being wound onto the peripheral cam surface of the respective cam member;
    an unwound part of the flexible tension member extending towards the respective pedal to be connected thereto to be pulled thereby, whereby the unwound part disengages the peripheral cam surface at a point of tangency having a radial distance from the respective cam axis, thereby providing a gearing ratio between angular movement of the rotating cam member and translational movement of the respective pedal;
    wherein said radial distance varies in accordance with the position of the respective pedal between the respective pedal's extended position and the respective pedal's retracted position, whereby said gearing ratio has;
    a minimum value when the respective pedal is in an intermediate position between the respective pedal's extended position and the respective pedal's retracted position;
    a first major value when the respective pedal is in the respective pedal's retracted position; and
    a second major value, when the respective pedal is in the respective pedal's extended position, whereby the minimum value is smaller than either of the first and the second major value.

2. A transmission according to claim 1, wherein each rotating cam member is a cam wheel, said cam wheel's cam axis being eccentric.

3. A transmission according to claim 1, wherein the two rotating cam members are mutually connected for mutual opposite rotation.

4. A transmission according to claim 1, wherein the transmission comprises:
    a driven wheel; and
    a drive train connecting the two rotating cam members and the driven wheel, said drive train comprising said rotating member and a free wheel mechanism allowing reverse rotation of the driven wheel.

5. A transmission according to claim 4, wherein the drive train comprises a gear shift mechanism.

6. A transmission according to claim 4, wherein the driven wheel comprises a bicycle rear wheel hub.

7. A transmission according to claim 6, wherein the rotating member comprises a sprocket wheel and the drive train comprises a sprocket chain.

8. A transmission according to claim 1, wherein an elastic stop is provided for the pedals' movement at the extended positions.

9. A transmission according to claim 1, wherein the pedals are mutually connected for mutual opposite movement.

10. A transmission for a human powered vehicle (HPV), for transmitting a reciprocating pedal movement into a rotational movement, comprising:
    a pair of pedals suspended for reciprocating movement between respective retracted and extended positions;
    a rotating element mounted for rotation around an axis of rotation;
    two rotating cam members rotating around respective cam axes, each rotating cam member having a peripheral cam surface;
    the rotating cam members being coupled to the rotating member through a respective one-way clutch for the rotating cam members to drive the rotating element in a single rotational direction;
    flexible tension members connecting either pedal to a respective one of the rotating cam members, each flexible tension member being fastened relative to the respective rotating cam member and being wound onto the peripheral cam surface of the respective cam member;
    an unwound part of the flexible tension member extending towards the respective pedal to be connected thereto to be pulled thereby;
    whereby the unwound part disengages the peripheral cam surface at a point of tangency having a radial distance from the respective cam axis, thereby providing a gearing ratio between angular movement of the rotating cam member and translational movement of the respective pedal;

wherein said radial distance varies in accordance with the position of the respective pedal between the respective pedal's extended position and the respective pedal's retracted position;

whereby said gearing ratio has a minimum value when the respective pedal is in an intermediate position between the respective pedal's extended position and the respective pedal's retracted position;

a first major value when the respective pedal is in the respective pedal's retracted position, and a second major value, when the respective pedal is in the respective pedal's extended position;

whereby the minimum value is smaller than either of the first and the second major value; and wherein said radial distance varies in accordance with the position of the respective pedal between the respective pedal's extended position and the respective pedal's retracted position, whereby said radial distance has:

a maximum value when the respective pedal is in an intermediate position between the respective pedal's extended position and the respective pedal's retracted position;

a first minor value when the respective pedal is in the respective pedal's retracted position; and a second minor value, when the respective pedal is in the respective pedal's extended position.

11. A human powered vehicle comprising a transmission for transmitting a reciprocating pedal movement into a rotational movement, comprising:

a pair of pedals suspended for reciprocating movement between respective retracted and extended positions;

a rotating element mounted for rotation around an axis of rotation;

two rotating cam members rotating around respective cam axes, each rotating cam member having a peripheral cam surface, the rotating cam members being coupled to the rotating member through a respective one-way clutch for the rotating cam members to drive the rotating element in a single rotational direction;

flexible tension members connecting either pedal to a respective one of the rotating cam members, each flexible tension member being fastened relative to the respective rotating cam member and being wound onto the peripheral cam surface of the respective cam member;

an unwound part of the flexible tension member extending towards the respective pedal to be connected thereto to be pulled thereby, whereby the unwound part disengages the peripheral cam surface at a point of tangency having a radial distance from the respective cam axis, thereby providing a gearing ratio between angular movement of the rotating cam member and translational movement of the respective pedal;

wherein said radial distance varies in accordance with the position of the respective pedal between the respective pedal's extended position and the respective pedal's retracted position, whereby said gearing ratio has;

a minimum value when the respective pedal is in an intermediate position between the respective pedal's extended position and the respective pedal's retracted position;

a first major value when the respective pedal is in the respective pedal's retracted position; and a second major value, when the respective pedal is in the respective pedal's extended position, whereby the minimum value is smaller than either of the first and the second major value.

12. A human powered vehicle according to claim 11, wherein said radial distance varies in accordance with the position of the respective pedal between the respective pedal's extended position and the respective pedal's retracted position, whereby said radial distance has:

a maximum value when the respective pedal is in an intermediate position between the respective pedal's extended position and the respective pedal's retracted position;

a first minor value when the respective pedal is in the respective pedal's retracted position; and a second minor value, when the respective pedal is in the respective pedal's extended position.

13. A human powered vehicle according to claim 11, wherein each rotating cam member is a cam wheel, said cam wheel's cam axis being eccentric.

14. A human powered vehicle according to claim 11, wherein the two rotating cam members are mutually connected for mutual opposite rotation.

15. A human powered vehicle according to claim 11, wherein the transmission comprises:

a driven wheel; and a drive train connecting the two rotating cam members and the driven wheel, said drive train comprising said rotating member and a free wheel mechanism allowing reverse rotation of the driven wheel.

16. A human powered vehicle according to claim 15, wherein the drive train comprises a gear shift mechanism.

17. A human powered vehicle according to claim 15, wherein the driven wheel comprises a bicycle rear wheel hub.

18. A human powered vehicle according to claim 17, wherein the rotating member comprises a sprocket wheel and the drive train comprises a sprocket chain.

19. A human powered vehicle according to claim 11, wherein an elastic stop is provided for the pedals' movement at the extended positions.

20. A human powered vehicle according to claim 11, wherein the pedals are mutually connected for mutual opposite movement.

* * * * *